(No Model.) 2 Sheets—Sheet 2.
W. COOPER & G. P. HAMPTON.
POWER TRANSMITTING AND SPEED REGULATING MECHANISM.
No. 511,289. Patented Dec. 19, 1893.
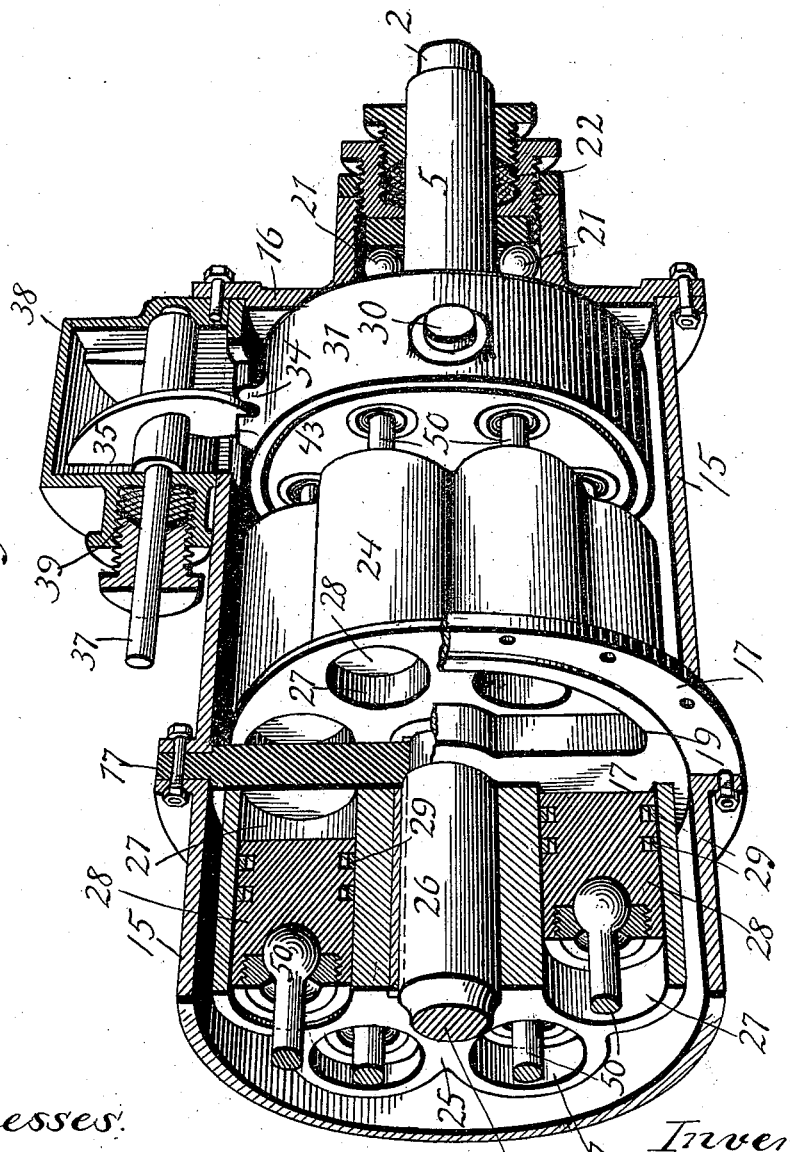

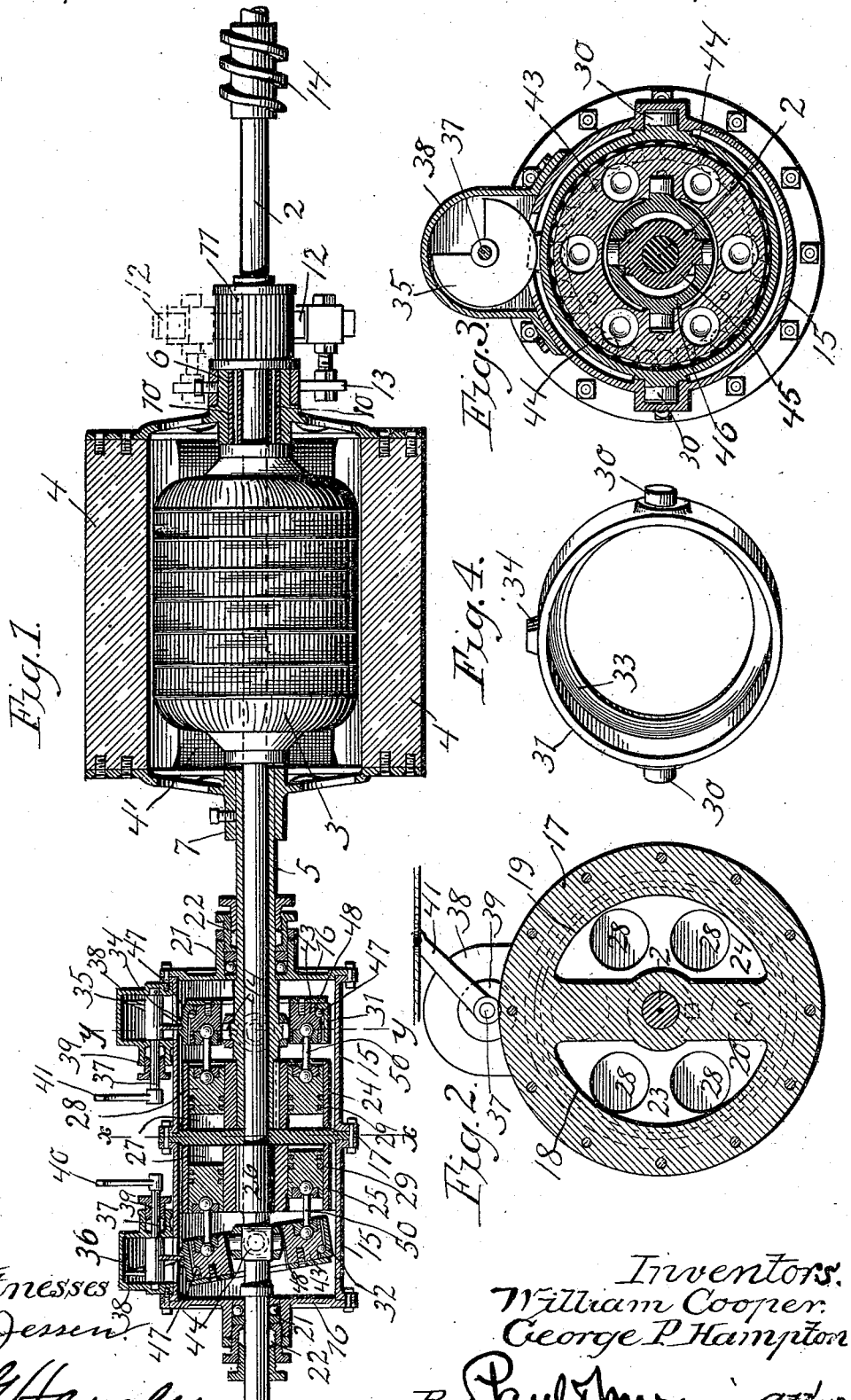

United States Patent Office.

WILLIAM COOPER AND GEORGE P. HAMPTON, OF MINNEAPOLIS, MINNESOTA, ASSIGNORS, BY MESNE ASSIGNMENTS, TO THE COOPER-HAMPTON ELECTRIC COMPANY, OF SAME PLACE.

POWER-TRANSMITTING AND SPEED-REGULATING MECHANISM.

SPECIFICATION forming part of Letters Patent No. 511,289, dated December 19, 1893.

Application filed January 27, 1892. Serial No. 419,375. (No model.)

*To all whom it may concern:*

Be it known that we, WILLIAM COOPER and GEORGE P. HAMPTON, residing at Minneapolis, in the county of Hennepin and State of Minnesota, have invented a certain Improved Power-Transmitting and Speed-Regulating Mechanism, of which the following is a specification.

Our invention relates in general to means for applying the full maximum power of a motor preferably an electric motor at its full speed to a varying load at any desired speed from zero to the maximum according to the conditions of the load at any given instant.

The object of the invention is to provide means for at once regulating the speed of a motor preferably an electric motor by mechanical means and for adapting a motor of two revolving parts to develop a maximum efficiency at all times, regardless of load, maintaining any desired ratio of speed of the motor substantially constant.

Our invention consists in the combination with two revolving parts, of a hydraulic governing connection constituting a part of the mechanism whereby the revolution of either revolving part may be checked or stopped; and whereby the power developed in either part may be transmitted directly to the load to act thereon in unison with the power developed by the other revolving part, all as hereinafter described and particularly pointed out in the claims.

Our invention will be more readily understood by reference to the accompanying drawings, in which—

Figure 1 is a longitudinal sectional view of apparatus embodying our invention. Fig. 2 is an enlarged transverse sectional view on the line $x$—$x$ of Fig. 1. Fig. 3 is a similarly enlarged transverse section on the line $y$—$y$ of Fig. 1. Fig. 4 is a detached view of the tilting disk in perspective. Fig. 5 is an enlarged perspective view showing the interior of our power transmitting and speed regulating mechanism.

We have shown in this application the speed regulator and power transmitter arranged in connection with an electric motor and applied to a car. We do not, however, limit ourselves to the use of the device claimed in this application with an electric motor or any other particular kind of motor, nor to a car or any particular device, as it is evident that the speed regulator and power transmitter may be used in connection with other forms of motor, and it may be used wherever it is desired to apply power to a load.

While we have shown and described the invention as arranged in connection with an electric motor and a car we do not wish, therefore, to be limited to its use in connection with either of these devices.

As shown in the drawings, 2 represents the armature shaft and 3 the armature thereon. The field magnets 4 energized by the windings 4' arranged upon cores extending between the pole pieces are supported upon the sleeves 5 and 6 arranged upon the shaft 2. The hub 7 of the field magnets is locked upon the sleeve 5 which is mounted upon the shaft of the armature. The ends of the armature coils pass through the openings 10 in the sleeve 6 to their respective segments of the commutator 11 fixed on the shaft. The brushes 12, one of which is shown in full lines and the other in dotted lines, are carried by the segment 13 fastened upon the bearing or hub of the revolving field magnet. The power connection with the armature shaft may be made in any desired manner as for instance through a worm 14 thereon. If desired the power instead of being transmitted to the load through the armature shaft may be passed directly to the load from the field magnets, a drum being arranged about the field magnets or being fixed on the sleeve 5 for the purpose. The ordinary connections with the electric supply mains and a reversing switch are used in connection with this motor, the current being introduced through the contact rings arranged on the shaft 2 or the sleeve 5 or both but these connections being well known are not shown in the drawings.

Assume that the field magnets and the armature are entirely free to revolve in their bearings respectively. It is obvious that under these conditions the two parts would revolve at substantially the same speeds, the ratio remaining at all times the same. On the other hand suppose one of the parts to be held stationary. In this case the other part would revolve at a speed equal to the sum of the normal speeds of the two parts. Again one part being impeded in its revolution the other part would make up in speed the difference between the speed of the first and the sum of the normal speeds of the two parts revolving under the conditions first named. Under the last supposition the motor as a whole would develop a power equal to its normal efficiency minus the power exerted to impede the part held and just so much power would be wasted. The regulation of the speed of an electric motor therefore in such a manner would not be practical or economical. We therefore incorporate in one and the same device with the speed regulator a mechanism by means of which the power of the rapidly moving part is transmitted directly to the slow moving part or to its load at the same speed as that of the slow moving part or vice versa, thereby applying to the load at any speed the maximum power of the motor operating at a constant peripheral speed.

The mechanism which we employ is shown most clearly in Figs. 1 and 5. The same is inclosed in a casing consisting of the two parts 15 having heads 16, respectively, and bolted together at their inner edges upon the disk 17, which, as shown, in Figs. 2 and 5, has two large segment like ports 18 and 19, separated by a wide bridge 20 through which the section of Fig. 1 is taken. The shaft 2 has ball bearings 21 in each of the heads 16 and the openings around the shaft at one end and around the sleeve 5 at the other end are closed by the stuffing boxes 22. The shaft 2 preferably extends through the whole casing having a bearing also in the center of the bridge 20. The sleeve 5, extends into the nearer half of the casing and abuts against the bridge wall 20. Both sides of the plate or disk 17 are nicely surfaced and the ends or faces 23 of the two drums 24 and 25 are adapted to seat snugly against the same. These two drums are keyed respectively upon the sleeve 5 and upon the enlarged portion 26 of the shaft 2, being held thereby against the port disk 17. The drums 24 and 25 are each provided with a number of barrels or cylinders 27, all of a diameter not exceeding the width of the bridge 20 lying between the two large ports or openings in the disk 17. The drums 24 and 25 may each have the same number of barrels as the other or the diameters of the barrels may be varied or their number in one drum exceed the number of barrels in the other drum. It has however been found that six barrels in each drum or a multiple of six gives for various reasons the greatest efficiency. In each of the smoothly bored barrels 27 we arrange a plunger 28 having packing rings 29 to fit tightly the walls of the barrel. These plungers are therefore adapted to operate back and forth in line with the shaft 2. In the ends of the casings 15 and pivoted therein by trunnions 30 (see Fig. 3) arranged at right angles with the bridge 20 are the two tilting disks or rings 31 and 32 each having the inwardly projecting rim or flange 33. On the tops of these rings we provide two or more of the lugs 34 with which the worm screws 35 and 36 are adapted to engage respectively. These worm screws are fixed on the shafts 37 and operate through openings shown in the top of the casing, the openings being covered and the worms housed by the boxes 38 having the stuffing boxes 39 fitting around the shafts 37. On the outside of these boxes and on the end of each shaft 37 is a lever or handle 40, 41 by means of which the worms may be operated to tilt the rings or disks 31, 32 into any desired angle with respect to the axis or shaft of the regulating mechanism and the motor.

In theory the plungers 28 are arranged to operate directly against the inclined surfaces or faces of the two tilting disks 31 and 32, the action being in one case to pump the oil confined in the ports 18 and 19 and in the barrels back and forth into and from said ports and the office of the other part of the mechanism being that of a motor to be driven by the pressure of the oil against its plungers. A direct slipping engagement of this kind would result in heavy friction and to avoid this detrimental friction between the parts we arrange with each disk a second ring 43 secured upon the shaft or sleeve as the case may be by a universal joint 44, the construction of which is shown clearly in Fig. 3 to consist in one ring 45 fixed upon the revolving shaft or the sleeve and trunnioned in a second ring 46 which in turn is trunnioned at right angles to the first in the ring 43 so that regardless of the position of the tilting disk the ring 43 may at all times follow its incline and at the same time revolve freely with the shaft. Anti-friction balls 47 are arranged between the back of each ring 43 and the inside of the flange of each tilting disk. The rings are held in the disk by the annular plates 48 engaging the outer edges of the tilting disks. Universal connections are made between the plungers 28 and opposite points on the rings 43 by means of the short connecting rods 50 having their ball ends secured in ball bearings arranged in the plungers and rings respectively. As shown clearly in Fig. 5 the exteriors of the drums 24 and 25 are preferably convoluted to conform to the positions of the barrels in the drums and to save unnecessary weight and cost in the drums.

The operation of the device is as follows: Suppose that the armature and the field magnets were revolving at substantially the same speeds under equal loads. At such a time the tilting disks and their revolving rings 43 would stand with their tops tilted away from one another and at similar angles with respect to the shaft so that as one set of plungers forces oil into a port the plungers of the opposite drum revolving in a different direction take up an equal quantity of oil. Thus the small body of oil confined in the plunger barrels and in the open ports is circulated from one port around into the other and the two parts finding no resistance will consequently move at practically the same speeds. The power developed at any time should of course in exact calculations be considered only after deducting the small amount of power consumed by friction of the oil under pressure and between the different parts of the mechanism. This item of friction however is so small as to require no further mention.

Now consider one of the disks, say that numbered 31, to have been moved into the position shown, while the disk 32 remains as before tilted with respect to the shaft. The result would be that the plungers of the drum 24 would not move save as carried by the drum revolving with the sleeve 5. Consequently the body of oil lying in front of the plungers in the other drum would not be changed and hence there being no outlet for the oil the armature would be locked and the field magnets alone revolve. At this time the tilting of the disk 31 at a slight angle to the shaft would start the plungers in the drum 24 into a rapid backward and forward throw. This reciprocation might be very slight or the maximum throw, varying the flow of oil from a single drop per revolution to the full capacity. In either case the plungers of the drum 25 would be unlocked and allowed to operate as rapidly as the oil was withdrawn from one port and discharged into the other by the plungers of the drum 24. By liberating the plungers of the drum 25 or locking the same, therefore, the speed of the armature shaft may be exactly controlled. It is obvious that by throwing the disk 32 into a perpendicular position and throwing the disk 31 into an inclined position the field magnets may be locked and held stationary and the armature permitted to revolve at full speed. Thus by varying the ratios between the bodies of oil confined in one side of the machine with respect to the body of oil contained in the other side the movements of the two drums and the shaft, sleeve, and armature and field magnets attached thereto may be positively and easily controlled while at the same time maintaining, constant, the speed between the peripheries of the two revolving parts of the motor and in consequence develop at all times the maximum efficiency of the motor. For if the added speed of the two parts were one thousand revolutions per minute and the armature revolved at the rate of three hundred revolutions per minute the field magnets would revolve at the rate of seven hundred per minute and a constant peripheral speed between the parts is maintained whatever the ratio of the speed between the parts may be. As above spoken of the action of the plungers in the two drums is considered passive. This is true only of those plungers which are at a given time drawing back in their barrels or cylinders. An active action also takes place as the oil is pumped or carried from one port by the withdrawing pistons, the oil, as the pistons pass the bridge, being forced out into the other port and against the pistons of the other drum to force the same back and these pistons acting against the upward incline of their tilting disk cause the drum and therewith the shaft to revolve. Thus the power of the free rapidly revolving part of the motor is caused to act directly upon the other to aid in the work thereof. These two actions therefore, namely, the active and the passive, which relations the plungers alternately assume, result in the adaptability of the mechanism for at once accurately regulating the speed at which the power of the motor is applied to the load from either part thereof; and, at the same time, for applying the full power of the electric motor at its highest efficiency through either part of the motor regardless of the speed at which that part is revolving.

Having thus described our invention, we claim as new and desire to secure by Letters Patent—

1. A motor and the shaft thereof in combination with a hydraulic mechanism composed of revolving drums, one of said drums being connected with the shaft of the motor, a series of plungers arranged in each of said drums in separate barrels provided therein, a disk arranged between said drums and toward which said plungers operate, said disks provided with ports, an inclined disk fixed about said shaft and with which the plungers of one of said drums are adapted to engage, a shaft connected with the other drum and an inclined disk arranged about the same to be engaged by the plungers of said other drum said shafts revolving in opposite directions, substantially as described.

2. A motor and the shaft thereof in combination with a hydraulic mechanism composed of revolving drums, one of said drums being connected with the shaft of the motor, a series of plungers arranged in each of said drums in separate barrels therein, a disk or plate arranged between said drums and provided with ports, a tilting disk fixed about the said shaft and with which the plungers of one of said drums are adapted to engage, a shaft connected with the other drum and a tilting disk arranged about the same to be engaged by the plungers of said drum said shafts adapted to revolve in opposite directions, substantially as described.

3. A motor and the shaft thereof in combination with a hydraulic mechanism composed of revolving drums, one of said drums being connected with the shaft of the said motor, a series of plungers arranged in each of said drums in separate barrels provided therein, a disk or plate arranged between said drums and having ports or openings, a tilting disk fixed about the shaft and with which the plungers of one of the drums are adapted to engage, a shaft connected with the other drum to revolve in an opposite direction to the first mentioned shaft, a tilting disk surrounding the shaft to be engaged by the plungers of the other drum, and means in connection with at least one of said tilting disks for tilting the same, substantially as described.

4. The electric motor composed of revoluble armature and field magnet parts in combination with the shafts of said parts and a hydraulic mechanism composed of revolving drums, one of said drums being connected with the shaft of the armature, a series of plungers arranged in each of said drums in separate barrels provided therein, a disk or plate arranged between said drums and toward which the plungers operate and having the ports described, a tilting disk about the shaft and with which the plungers of one of the drums are adapted to engage, the field-magnet shaft connected with the other drum, a tilting disk surrounding the same, to be engaged by the plungers of that drum and means in connection with at least one of said tilting disks for tilting the same, substantially as described.

5. A hydraulic mechanism composed of oppositely revoluble drums and shafts connected therewith, one drum being connected with each shaft, a series of plungers arranged in both of said drums each plunger being arranged in a separate barrel provided therefor, a disk arranged between said drums and provided with two large ports, an inclined disk arranged about each of said shafts and with which the plungers of the several drums are adapted to engage respectively, and means for altering the inclination of said inclined disks, substantially as and for the purpose specified.

6. The combination in a hydraulic mechanism, of a disk provided with ports, a casing extending from each side of said disk, drums arranged in said casing, one on each side of said disk, a shaft for each drum, said shafts being adapted to revolve in opposite directions bearings for said shafts, each drum provided with a series of barrels, plungers adapted to operate therein, tilting disks trunnioned in said casing, revoluble rings arranged in said disk, said rings connected with said shafts by universal joints, connecting rods extending between said rings and said plungers opposite the same, and means for tilting said disks, substantially as described.

7. The combination with a disk 17 having ports 18 and 19, of two drums to engage opposite sides thereof and adapted to revolve in opposite directions, each of said drums provided with a series of barrels 27, a shaft for each of said drums, plungers arranged in said barrels, an inclined disk arranged opposite the outer end of each drum and stationary with respect thereto, said plungers adapted to engage the same, and means in connection with one inclined disk for altering the angle or inclination thereof, substantially as described.

In testimony whereof we have hereunto set our hands this 19th day of January, 1892.

WILLIAM COOPER.
GEORGE P. HAMPTON.

In presence of—
C. G. HAWLEY,
F. S. LYON.